US008457888B2

(12) United States Patent  (10) Patent No.: US 8,457,888 B2
Ranford  (45) Date of Patent: Jun. 4, 2013

(54) METHOD FOR REMINDING USERS ABOUT FUTURE APPOINTMENTS WHILE TAKING INTO ACCOUNT TRAVELING TIME TO THE APPOINTMENT LOCATION

(75) Inventor: Paul Ranford, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 433 days.

(21) Appl. No.: 12/399,977

(22) Filed: Mar. 8, 2009

(65) Prior Publication Data

US 2010/0228473 A1    Sep. 9, 2010

(51) Int. Cl.
*G01C 21/00*    (2006.01)

(52) U.S. Cl.
USPC .................... 701/465; 701/468; 705/7.19

(58) Field of Classification Search
USPC .............. 701/200, 201, 204, 207, 209; 705/8, 705/9
See application file for complete search history.

(56) References Cited

U.S. PATENT DOCUMENTS

| | | | |
|---|---|---|---|
| 6,678,613 B2* | 1/2004 | Andrews et al. | 701/213 |
| 7,149,504 B1* | 12/2006 | Weaver et al. | 455/414.2 |
| 7,847,686 B1* | 12/2010 | Atkins et al. | 340/539.13 |
| 7,869,941 B2* | 1/2011 | Coughlin et al. | 701/204 |
| 2003/0004776 A1 | 1/2003 | Perrella | |
| 2003/0060979 A1* | 3/2003 | Andrews et al. | 701/213 |
| 2005/0021227 A1* | 1/2005 | Matsumoto et al. | 701/207 |
| 2005/0114014 A1* | 5/2005 | Isaac | 701/204 |
| 2005/0227712 A1* | 10/2005 | Estevez et al. | 455/456.3 |
| 2006/0168592 A1* | 7/2006 | Andrews et al. | 719/318 |
| 2006/0218029 A1* | 9/2006 | Chin | 705/8 |
| 2006/0227047 A1* | 10/2006 | Rosenberg | 342/357.13 |
| 2007/0013551 A1* | 1/2007 | Gueziec | 340/905 |
| 2007/0118415 A1* | 5/2007 | Chen et al. | 705/8 |
| 2007/0250257 A1* | 10/2007 | Almy | 701/200 |
| 2008/0033640 A1* | 2/2008 | Amano | 701/209 |
| 2008/0086455 A1* | 4/2008 | Meisels et al. | 707/3 |
| 2008/0167937 A1* | 7/2008 | Coughlin et al. | 705/9 |
| 2008/0167938 A1* | 7/2008 | Meisels et al. | 705/9 |
| 2008/0195312 A1* | 8/2008 | Aaron et al. | 701/209 |
| 2008/0228547 A1* | 9/2008 | Doss et al. | 705/8 |
| 2009/0005965 A1* | 1/2009 | Forstall et al. | 701/201 |
| 2009/0075673 A1* | 3/2009 | Kim et al. | 455/456.1 |
| 2009/0105934 A1* | 4/2009 | Tajima et al. | 701/118 |
| 2009/0105940 A1* | 4/2009 | Bitan | 701/201 |
| 2009/0192702 A1* | 7/2009 | Bourne | 701/200 |
| 2009/0319172 A1* | 12/2009 | Almeida et al. | 701/201 |
| 2010/0017118 A1* | 1/2010 | Dougherty | 701/209 |
| 2010/0030612 A1* | 2/2010 | Kim et al. | 705/9 |
| 2010/0198646 A1* | 8/2010 | Mikan et al. | 705/9 |

FOREIGN PATENT DOCUMENTS

| | | |
|---|---|---|
| TW | 200705304 | 2/2007 |
| TW | 200717337 | 5/2007 |
| TW | 200829873 | 7/2008 |
| WO | 2007051128 A2 | 5/2007 |
| WO | 2008083273 A2 | 7/2008 |

* cited by examiner

*Primary Examiner* — Helal A Algahaim

(74) *Attorney, Agent, or Firm* — Winston Hsu; Scott Margo

(57) ABSTRACT

A method of notifying a user of an appointment at a remote location includes receiving an appointment time and an appointment location inputted into a personal navigation device operated by a user, determining the current location of the personal navigation device, and determining the user's routing preferences when traveling to the appointment location. The method also includes estimating a travel time for the user to travel from the current location to the appointment location when traveling according to the user's routing preferences, determining a notification time based on the estimated travel time and the appointment time, and notifying the user of the appointment at the notification time.

13 Claims, 4 Drawing Sheets

| Segment | A→B | B→C | C→D | E→F |
|---|---|---|---|---|
| Mode of transportation | Car/Highway | Car/Highway | Ferry | Train |
| Trip time | 10 Minutes | 8 Minutes | 40 Minutes | 17 Minutes |

FIG. 2

| Location | Zoo | Shopping mall | Beach lot A | Beach lot B |
|---|---|---|---|---|
| Parking spaces available | 142 | 40 | 0 | 40 |
| Parking and walking time | 3 Minutes | 5 Minutes | 1 Minute | 10 Minutes |

FIG. 3

METHOD FOR REMINDING USERS ABOUT FUTURE APPOINTMENTS WHILE TAKING INTO ACCOUNT TRAVELING TIME TO THE APPOINTMENT LOCATION

BACKGROUND OF THE INVENTION

1. Field of the Invention

The invention relates to personal navigation devices, and more particularly, to a method for utilizing a personal navigation device to estimate a travel time to a venue and for reminding users about future appointments at the venue while providing users with enough time to travel to the venue.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Personal GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

Traditionally, people have relied upon paper or electronic calendars for keeping track of their future appointments. Electronic calendars can give the user a reminder about the appointment at a set amount of time before the appointment begins.

A problem arises when a user has an appointment at a venue that is away from their current location, and the user wishes to be reminded in time to start the journey and arrive at the appointment location on time, but not too early. This is particularly difficult for the user to estimate when the user is unfamiliar with the area or is not sure where they will be immediately before the appointment.

Automated calendar systems, like those found in a computer, a personal digital assistant (PDA), or a smartphone often know where the appointment is, but they do not automatically or dynamically take in to account the amount of time it takes to get to the venue.

Typically, appointment systems allow the user to determine a length of time before the appointment that they want to be reminded of. However, this does not take into account travel times since the appointment system cannot accurately know or predict the location of the user. Appointment systems also do not have access to information that will allow them to calculate the time that it will take the user to travel to the venue in order that the reminder can be raised at the correct time.

The user of the appointment system can manually estimate the time that it will take to travel based on their expected location prior to the meeting. However, this assumes that they know where they will be, that they will be where they intended to be, and that there are not other events that will change the time that the journey will take.

SUMMARY OF THE INVENTION

It is therefore one of the primary objectives of the claimed invention to provide a method of reminding users about future events while taking into account the user's current location and the travel time for the user to arrive at the appointment location.

According to an exemplary embodiment of the claimed invention, a method of notifying a user of an appointment at a remote location is disclosed. The method includes receiving an appointment time and an appointment location inputted into a personal navigation device operated by a user, determining the current location of the personal navigation device, and determining the user's routing preferences when traveling to the appointment location. The method also includes estimating a travel time for the user to travel from the current location to the appointment location when traveling according to the user's routing preferences, determining a notification time based on the estimated travel time and the appointment time, and notifying the user of the appointment at the notification time.

According to another exemplary embodiment of the claimed invention, a method of notifying a user of an appointment at a remote location is disclosed. The method includes receiving an appointment time and an appointment location inputted into a personal navigation device operated by a user, determining the current location of the personal navigation device, and determining the availability of parking near the appointment location. The method also includes estimating a travel time for the user to travel from the current location to the appointment location while taking time for parking into consideration, determining a notification time based on the estimated travel time and the appointment time, and notifying the user of the appointment at the notification time.

According to yet another exemplary embodiment of the claimed invention, a method of notifying a user of an appointment at a remote location is disclosed. The method includes receiving an appointment time and an appointment location inputted into a personal navigation device operated by a user, wherein the appointment location is not a fixed location, determining the current location of the personal navigation device, and determining the current appointment location. The method also includes estimating a travel time for the user to travel from the current location of the personal navigation device to the current appointment location, determining a notification time based on the estimated travel time and the appointment time, and notifying the user of the appointment at the notification time.

It is an advantage that the present invention takes into account the amount of time that the user needs to travel from their current location to the appointment location for providing the user with a reminder at the correct time. In this way, the user can arrive at the appointment location on time, but without being too early. Furthermore, the user's time is used efficiently and the user has the flexibility of being able to travel to other locations before the appointment begins and not risk missing the appointment due to being too far away from the appointment location.

These and other objectives of the present invention will no doubt become obvious to those of ordinary skill in the art after

BRIEF DESCRIPTION OF THE DRAWINGS

FIG. 2 shows examples of a user's preferred travel routes along various segments of a route.

FIG. 3 shows examples of parking lots stored in a parking data section of memory.

DETAILED DESCRIPTION

Figure 1:
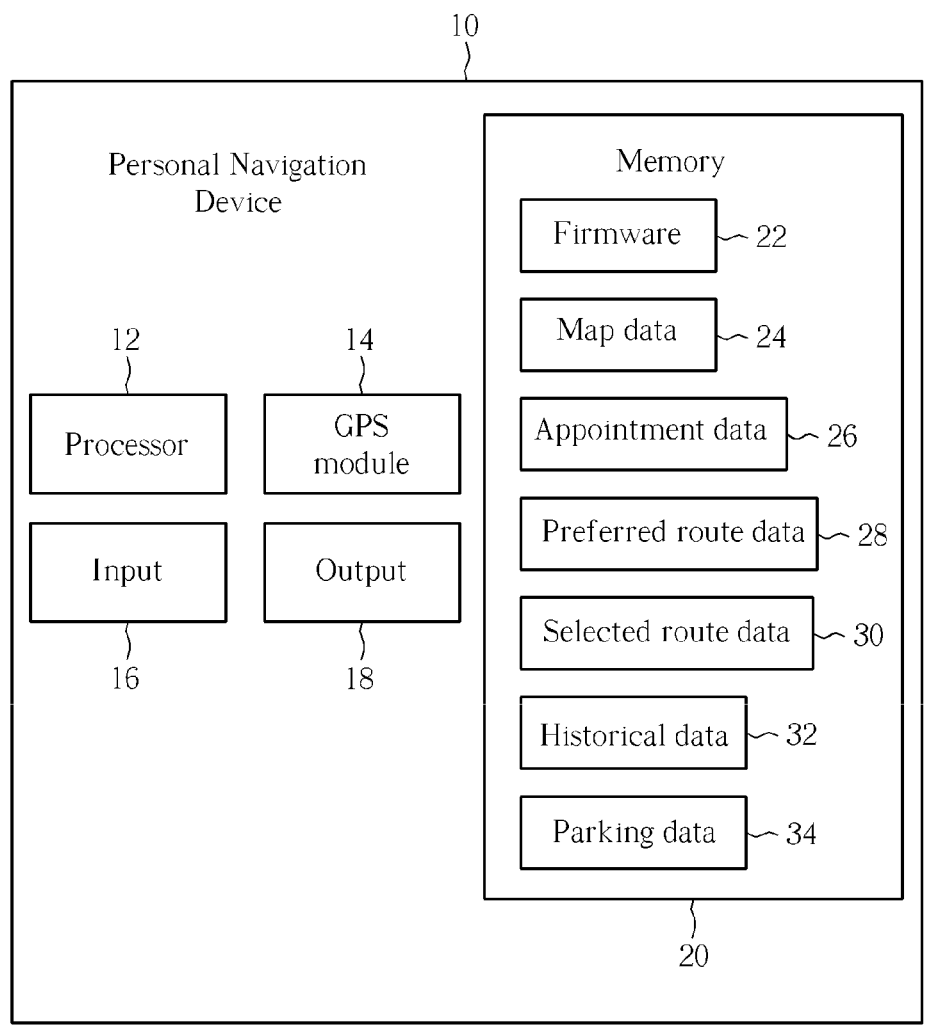
FIG. 1 is a block diagram of a personal navigation device according to the present invention.

Please refer to FIG. 1. FIG. 1 is a block diagram of a personal navigation device 10 according to the present invention. The personal navigation device 10 contains a processor 12, a GPS module 14 for receiving the current location of the personal navigation device 10, an input 16 such as control buttons and a touch-screen, an output 18 such as a speaker and a display, and a memory 20. The memory contains firmware 22 executed by the processor 12 for running the personal navigation device 10. The memory 20 also stores map data 24 which contains general map information such as data about roads, addresses, and routes. For each appointment that is entered into the personal navigation device 10, the memory 20 stores appointment data 26. The appointment data 26 stores the time of the appointment, the location of the appointment, and a preparation buffer time which indicates how much extra time the user would like for preparing for the appointment. The memory 20 also stores preferred route data 28 indicating which routes the user usually takes when getting from one location to another. The personal navigation device 10 can use these preferred routes to calculate the amount of travel time needed to reach the destination, although the user can always select other routes instead of his preferred routes. Once the user makes his choice on a selected route, information about the route is stored in the memory 20 as selected route data 30. To better estimate the amount of travel time needed for various routes, the memory 20 can also store historical data 32 containing historical information about travel times. Parking data 34 can indicate the availability of parking lots in areas near the appointment location.

Please refer to FIG. 2. FIG. 2 shows examples of a user's preferred travel routes along various segments of a route. For example, from point A to point B, the user prefers to travel by car on the highway and the trip usually takes 10 minutes. From point B to point C, the user also prefers to travel by car on the highway and the trip usually takes 8 minutes. From point C to point D, the user prefers to travel by ferry and the trip usually takes 40 minutes. From point D to point E, the user prefers to travel by train and the trip usually takes 17 minutes.

As more historical data about the user's past trips and driving times becomes available, the personal navigation device 10 is better able to estimate the amount of time necessary to reach the destination, and the historical data 32 is updated to reflect this. Historical travel times can become more accurate when they take into consideration the time and day that the user is traveling on. Otherwise, if no historical data is available and the user has not input his own estimated travel time, the personal navigation device may be forced to calculate its own default estimated travel time. For example, the default estimated travel time can be calculated by dividing the total routing distance of all trip segments by the current speed. As not all trip segments can be covered at the same speed, this estimation is not as accurate as using historical travel times.

When traveling to locations for which the personal navigation device 10 cannot provide an estimate of the travel time required, the user can input an estimated travel time for certain segments of the route. As the trip is repeatedly made, the personal navigation device 10 can learn the driving times for these routes and store data related to the trip in the historical data 32 of the memory 20.

The processor 12 of personal navigation device 10 will take several factors into consideration when determining when to alert the user about the upcoming appointment. First of all, the appointment time, the appointment location, and the current location of the user are essential pieces of information. Because the user may be traveling to other places before the appointment begins, the current location of the user must be periodically monitored for determining when to alert the user about the appointment. Additionally, the preparation buffer time must be considered to allow the user to have extra time for preparing for the appointment. In order to accurately estimate the travel time to the appointment location, the personal navigation device 10 must also consider the available routes to the venue, the speed limits on the routes, historical statistics of travel times across various segments of the routes, the routing preferences of the user (i.e. public highways, toll roads, scenic routes), the user's preferred modes of transportation (i.e. car, walk, bicycle, train, bus, or mixed), the availability of parking, and the proximity of parking to the venue.

As the user moves, the time required to arrive at the appointment location is recalculated until the time approaches the time that the user needs to start the journey, which is the time that the personal navigation device 10 needs to notify the user of the appointment. When the notification time arrives, the personal navigation device 10 alerts the user and can then, at the user's request or automatically, provide instructions that will navigate the user to the appointment location. The system can also provide the users with their progress on the trip and let them know if they are currently ahead of schedule or behind schedule for their trip. This progress information is useful for many reasons. If the user is ahead of schedule, the user can use this time wisely by performing other tasks such as refueling his car, visiting other associates, or purchasing items at a store. If the user is behind schedule, the user can let other parties know about his expected late arrival at a very early stage to minimize the inconvenience experienced by the other parties. Once the user has arrived at the appointment location, the personal navigation device 10 can display other information or reminders to the user such as the names of the people he is about to meet, a reminder to take certain items or documents to the appointment, and so on. The output 18 of the personal navigation device 10 can be used to alert the user through visual or audible alerts.

Because the availability of parking changes dynamically, the personal navigation device 10 can help users see which parking lots near the appointment location have parking, let the user know how many spaces are currently available if this information is available, and let the user how long it takes to walk or travel from the parking lot to the appointment location after parking.

The personal navigation device 10 can receive real-time information on parking, weather, or traffic conditions through the internet, through radio channels, or other sources. Real-time parking information can indicate how many parking spaces are available at parking lots. Real-time traffic information may indicate traffic conditions such as accidents, road blockages, or slow travel speeds on roads. Weather conditions may indicate situations such as heavy rain, flooding, or snowstorms. Both traffic and weather conditions may increase the amount of time needed to reach a destination, and estimated travel times can be adjusted accordingly.

Please refer to FIG. 3. FIG. 3 shows examples of parking lots stored in the parking data 34 section of the memory 20. When shared data is available on the current number of parking spots remaining, this data can also be provided to the user to help him making a decision on where to park and to help estimate the total traveling time. For example, if traveling to the zoo, the zoo parking lot has 142 spaces currently available, and requires the user to walk approximately 3 minutes from the parking lot to the zoo. If going to the shopping mall, there are 40 spaces available and a 5-minute walk is required. If driving to the beach, beach parking lot A requires only a 1-minute walk, but does not currently have any available spaces. However, beach parking lot B has 40 available spaces, but requires a 10-minute walk.

In addition to current parking information, other dynamic sources can offer information that may affect travel time such as traffic conditions and weather conditions. All of these conditions can be taken into account when calculating the estimated travel time to reach the appointment location. Due to the large amount of dynamic information that can affect the estimated travel time from the user's current location to the appointment location, calculations must be performed at regular intervals to re-calculate the estimated travel time.

Other embodiments of the present invention are also possible. For example, the appointment location may be mobile instead of being fixed. In this situation, the user or the personal navigation device 10 can be provided with the updated location of the appointment location, and the personal navigation device 10 can accordingly calculate an updated estimated travel time. Furthermore, the appointment time can be updated on the fly as well. Notification about the updated appointment location or updated appointment time can be received in the form of a short message, and the short message can update the appointment information stored in the calendar. The user may also manually update the appointment location or appointment time once the user is aware of this updated information. In yet another embodiment, there may be a situation where two or more users are traveling towards each other, and the personal navigation device 10 can keep track of each user for allowing one user to find and book a last-minute venue using a local search based around the expected point of convergence.

Figure 4:
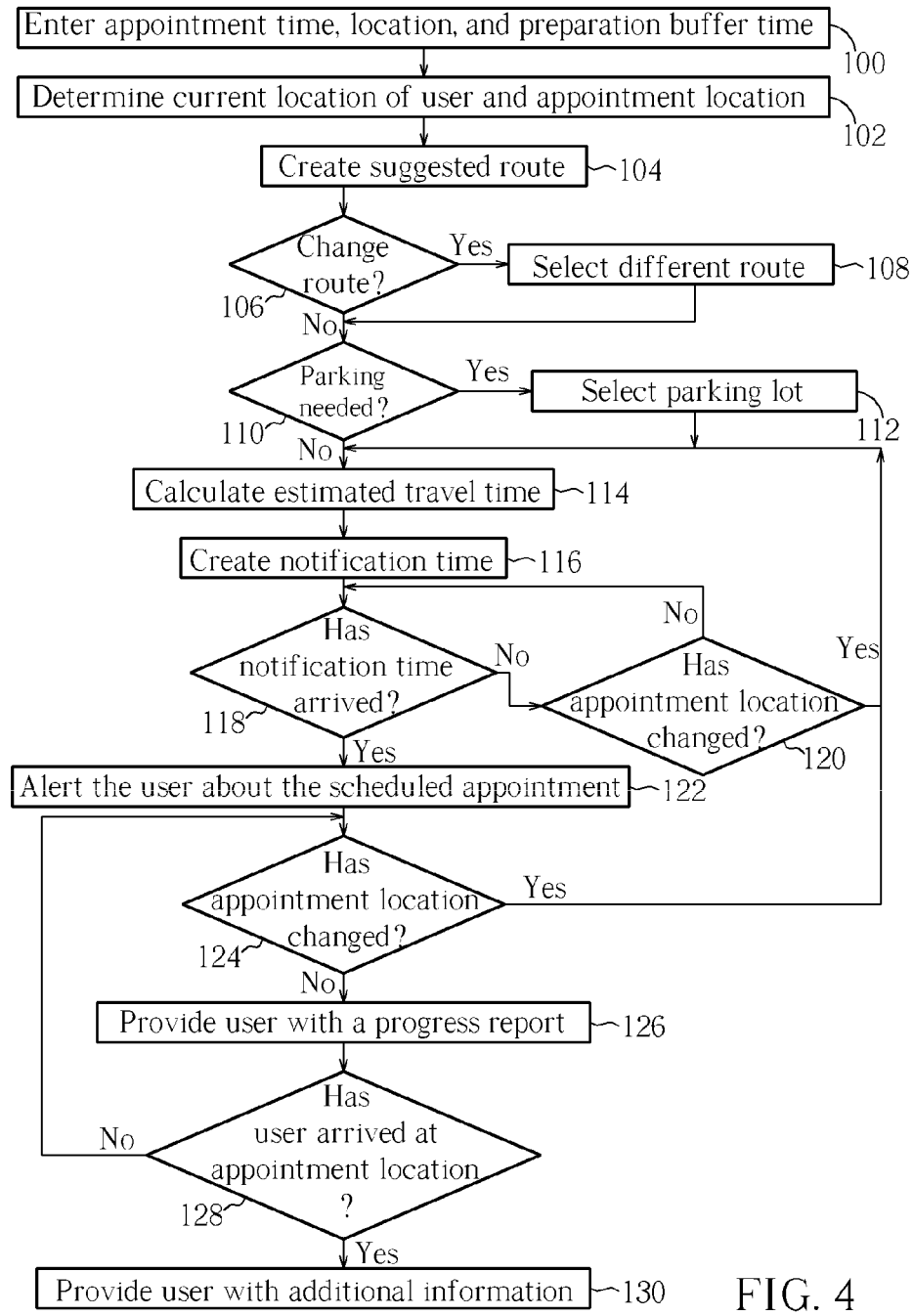
FIG. 4 is a flowchart illustrating the present invention method for notifying a user of an appointment at a remote location.

Please refer to FIG. 4. FIG. 4 is a flowchart illustrating the present invention method for notifying a user of an appointment at a remote location. Steps contained in the flowchart will be explained below.

Step 100: The user enters the appointment time, the appointment location, and the user's preparation buffer time and stores this information in the appointment data 26 of the memory 20.

Step 102: The personal navigation device 10 uses the map data 24 of the memory 20 and the GPS module 14 to determine the current location of the user and the current appointment location.

Step 104: The personal navigation device 10 creates a suggested route using the user's preferred route data 28.

Step 106: The personal navigation device 10 asks the user if he would like to change the route from the suggested route. If the user would like to change the route, go to step 108. Otherwise, go to step 110.

Step 108: The user selects a different route.

Step 110: The personal navigation device 10 asks the user if parking is needed at the appointment location. If so, go to step 112. If not, go to step 114.

Step 112: The user selects a parking lot based on the information stored in the parking data 34 as well as current parking conditions.

Step 114: The processor 12 of the personal navigation device 10 calculates the estimated travel time from the current location of the personal navigation device 10 to the current appointment location based on the driving time required, the parking time required, and other dynamic conditions such as weather and traffic.

Step 116: The processor 12 creates a notification time at which to alert the user of the upcoming appointment. The notification time takes into account the estimated travel time, the user's preparation buffer time, and the appointment time.

Step 118: Determine if the notification time has arrived. If so, go to step 122. If not, go to step 120.

Step 120: Determine if the appointment location has changed. If so, go back to step 114. If not, go back to step 118.

Step 122: Alert the user about the scheduled appointment. The user can then be provided with travel instructions on how to travel to the appointment location.

Step 124: Determine if the appointment location has changed after the user has been alerted about the scheduled appointment. If so, go back to step 114. If not, go to step 126.

Step 126: Provide the user with a progress report indicating how far away they are from the appointment location as well as whether the user is running early or late.

Step 128: Determine if the user has arrived at the appointment location. If so, go to step 130. If not, go back to step 124.

Step 130: Provide the user with additional information about the appointment. The user can be reminded about the names of the people he is about to meet, a reminder to take certain items or documents to the appointment, and so on.

In summary, the present invention personal navigation device 10 takes into account the amount of time that the user needs to travel from their current location to the appointment location for providing the user with a notification at the correct time. The estimated travel time can be dynamically calculated depending on parking conditions, traffic conditions, weather conditions, and the current location of both the user and the appointment location. In this way, the user can arrive at the appointment location on time, but without being too early. Furthermore, the user's time is used efficiently and the user has the flexibility of being able to travel to other locations before the appointment begins and not risk missing the appointment due to being too far away from the appointment location.

Those skilled in the art will readily observe that numerous modifications and alterations of the device and method may be made while retaining the teachings of the invention.

What is claimed is:

1. A method of notifying a user of an appointment at a remote location, the method comprising:

receiving an appointment time and an appointment location inputted into a personal navigation device operated by the user;

determining a current location of the personal navigation device;

determining a user's routing preferences when traveling to the appointment location, wherein the user's routing preferences are selected from public highways, toll roads, and scenic routes;

estimating, via a processor of the personal navigation device, a travel time for the user to travel from the current location to the appointment location when traveling according to the user's routing preferences;

determining, via the processor, a notification time based on the estimated travel time and the appointment time;

notifying the user of the appointment at the notification time;

determining, via the processor, that the current location matches the appointment location; and outputting a reminder about names of people the user will meet during the appointment after determining that the current location matches the appointment location.

2. The method of claim 1, determining the user's routing preferences comprises determining a user's preferred mode of transportation over segments of a route.

3. The method of claim 1 further comprising:

receiving a preparation buffer time inputted into the personal navigation device indicative of an amount of extra time the user would like to prepare for the appointment; and determining the notification time based on the estimated travel time, the preparation buffer time, and the appointment time.

4. The method of claim 1, wherein the travel time is estimated according to known speed limits.

5. The method of claim 1, wherein the travel time is estimated according to historical statistics of travel times.

6. The method of claim 1 further comprising notifying the user that the user is ahead of schedule or behind schedule for the appointment before the user arrives at the appointment location.

7. The method of claim 1 further comprising providing a default travel time that is used as the estimated travel time when the personal navigation device is not able to determine the travel time to the appointment location.

8. A method of notifying a user of an appointment at a remote location, the method comprising:

receiving an appointment time and an appointment location inputted into a personal navigation device operated by the user, wherein the appointment location is not a fixed location;

determining a current location of the personal navigation device;

determining a current appointment location;

estimating, via a processor of the personal navigation device, a travel time for the user to travel from the current location of the personal navigation device to the current appointment location;

determining, via the processor, a notification time based on the estimated travel time and the appointment time;

notifying the user of the appointment at the notification time;

receiving via a short message an updated appointment location or an updated appointment time for the appointment;

updating the appointment time or the appointment location of the appointment according to the short message;

notifying the user about the updated appointment location or the updated appointment time;

determining, via the processor, that the current location of the personal navigation device matches the updated appointment location; and outputting a reminder about names of people the user will meet during the appointment after determining that the current location of the personal navigation device matches the updated appointment location.

9. The method of claim 8 further comprising:

receiving a preparation buffer time inputted into the personal navigation device indicative of an amount of extra time the user would like to prepare for the appointment; and determining the notification time based on the estimated travel time, the preparation buffer time, and the appointment time.

10. The method of claim 8, wherein the travel time is estimated according to known speed limits.

11. The method of claim 8, wherein the travel time is estimated according to historical statistics of travel times.

12. The method of claim 8 further comprising notifying the user that the user is ahead of schedule or behind schedule for the appointment before the user arrives at the appointment location.

13. The method of claim 8 further comprising providing a default travel time that is used as the estimated travel time when the personal navigation device is not able to determine the travel time to the appointment location.

* * * * *